United States Patent [19]

Gotto

[11] 4,131,001
[45] Dec. 26, 1978

[54] METHOD TO PREVENT UNAUTHORIZED USE OF CASSETTE TAPE RECORDERS AND A DEVICE ACCORDING TO THE METHOD

[76] Inventor: Raymond J. Gotto, Vallhornsvägen 2, Trångsund, Sweden, S-142 00

[21] Appl. No.: 742,349

[22] Filed: Nov. 16, 1976

[30] Foreign Application Priority Data

Nov. 17, 1975 [SE] Sweden .............................. 7512869

[51] Int. Cl.² ............................................. E05B 73/00
[52] U.S. Cl. ......................................... 70/14; 70/432
[58] Field of Search ................. 70/14, 57, 58, 85, 86, 70/432, 433; 206/1.5, 387; 312/333

[56] References Cited

U.S. PATENT DOCUMENTS 3,130,571  4/1964  Neumann .............................. 70/58

Primary Examiner—Robert L. Wolfe
Attorney, Agent, or Firm—Holman & Stern

[57] ABSTRACT

A method and a device to prevent unauthorized use of cassette tape recorders, comprising of a cassette shaped part, insertable into a cassette tape recorder through the cassette opening, said part being arranged with locking means, thus enabling the part to take up an interlocked relationship with the cassette tape recorder when inserted into same.

19 Claims, 13 Drawing Figures

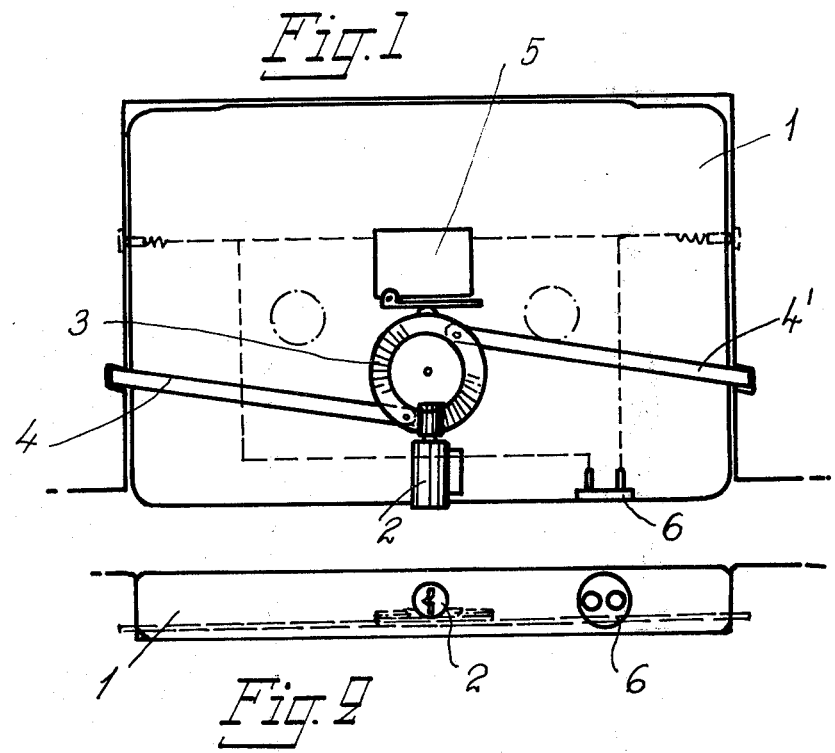
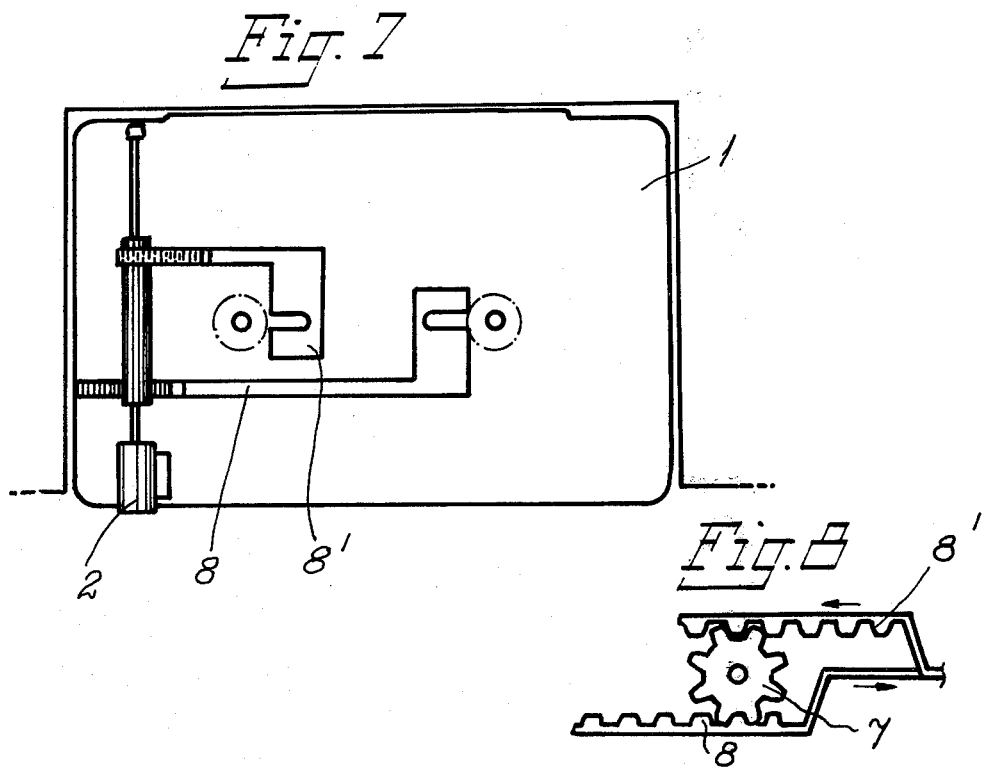

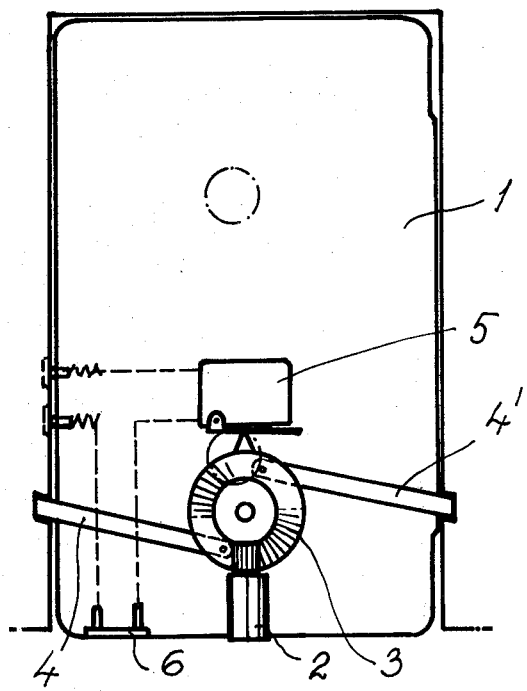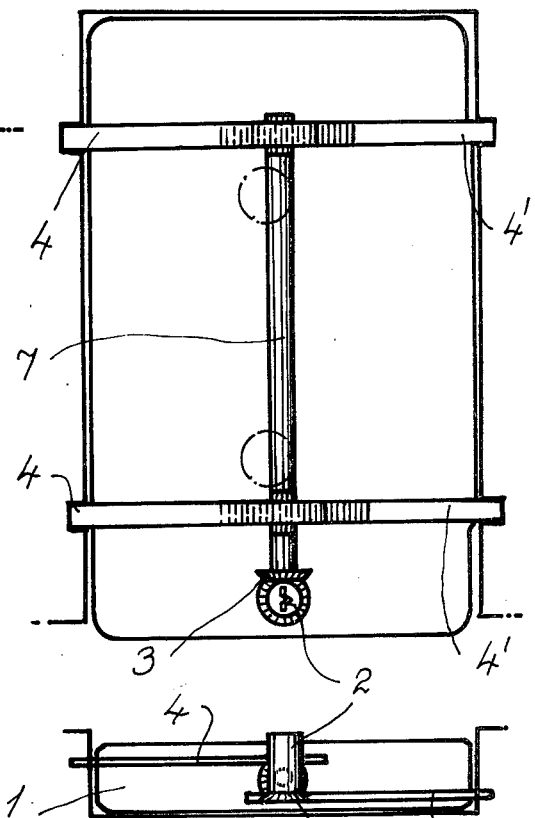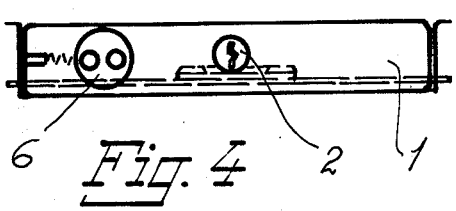

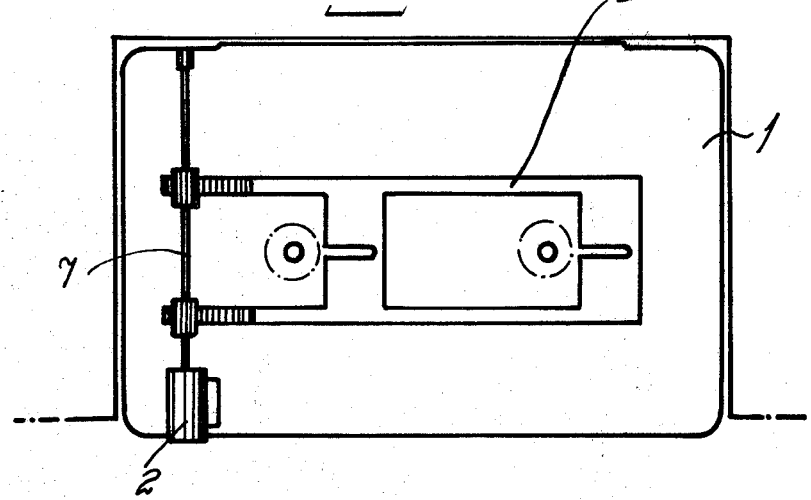
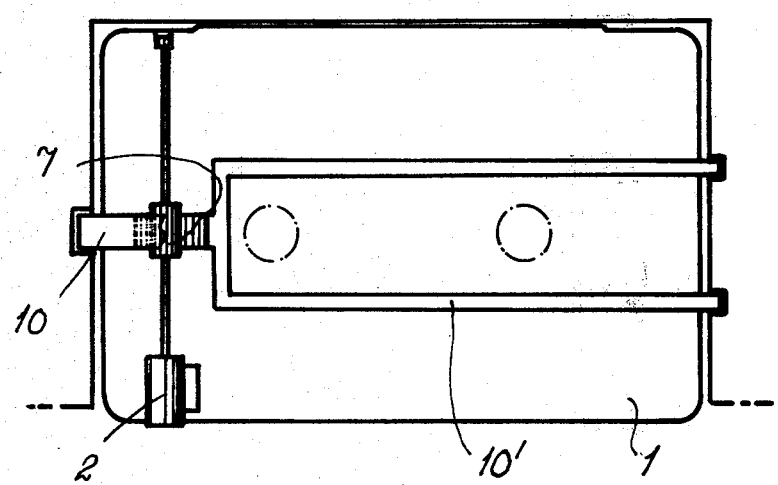
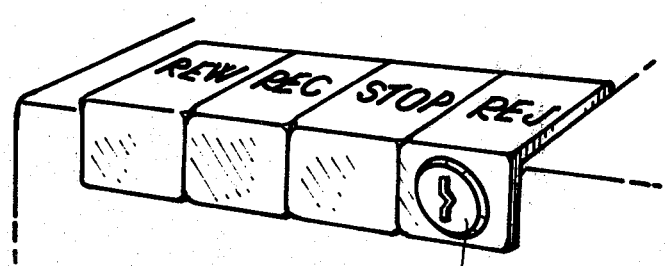

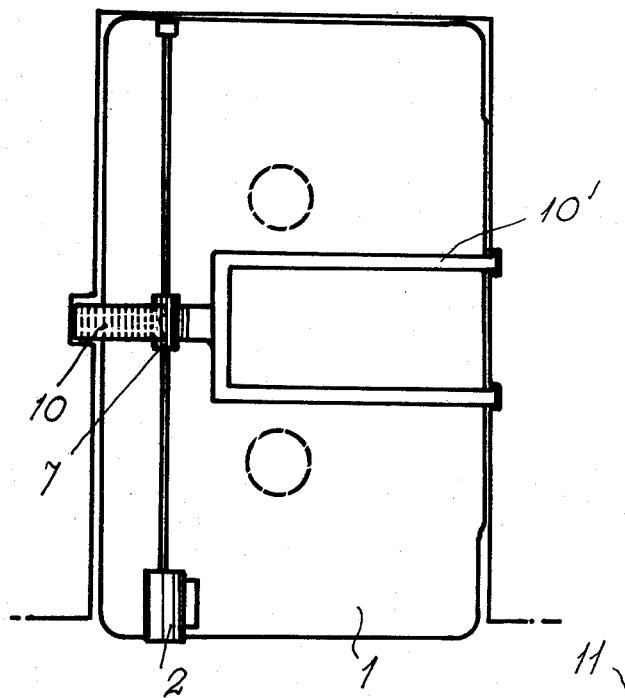
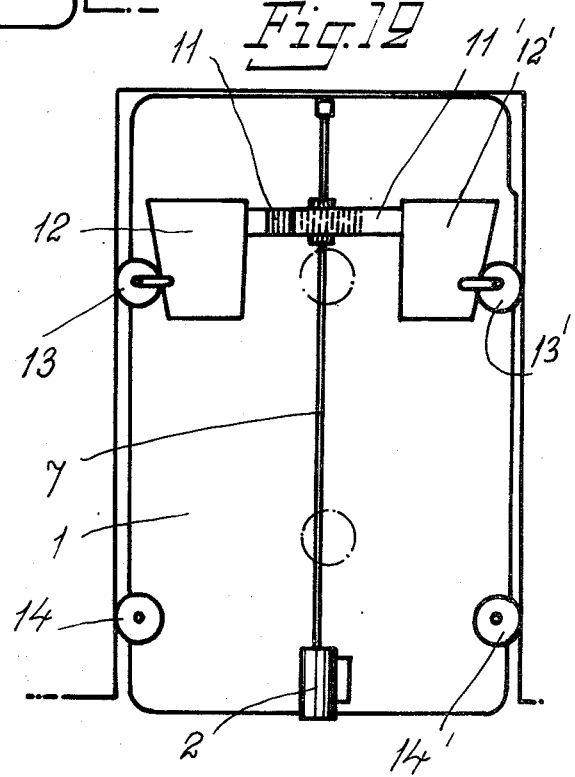

METHOD TO PREVENT UNAUTHORIZED USE OF CASSETTE TAPE RECORDERS AND A DEVICE ACCORDING TO THE METHOD

The present invention relates to a method to prevent unauthorized use of cassette tape recorders and a device according to the method.

A need for a protective means against theft and unauthorized use of cassette tape recorders is previously known, e.g., for stereo tape recorders as used in cars and other vehicles, but also for other types of tape recorders, such as video and sound tape recorders. Since the above type of tape recorders normally combine small size with a relatively high price, e.g., stereo cassette decks, they have become an extremely desirable object in connection with thefts and burglary. In order to prevent theft of cassette tape recorders for mobile use, they have in certain cases been arranged in a lockable supporting means, but as a result, both the supporting means and the tape recorder have been removed as one fully operatable unit.

The object of the present invention is to disclose a previously unknown method to prevent unauthorized use of cassette tape recorders, which completely prevents use of the tape recorder. Even if a tape recorder is removed from a vehicle, a shop, a dwelling or any other location, it cannot be used for its purpose, whereby theft protection is indirectly achieved. In view of the present high theft frequency with regard to mobile and stationary used cassette tape recorder units, its is desirable to reduce the number of thefts, since the damage caused when stealing mobile cassette tape recorders further increases the costs in connection with each individual theft. When using a device according to the present invention in connection with tape recorders arranged in vehicles, it is possible to see that the tape recorder cannot be used by an unauthorized person before removing the unit from the car, i.e., that the value of a stolen unit is nonexistent, since the device can not be removed without complete destruction of the tape recorder.

The method according to the present invention is mainly characteristic thereof, that a cassette shaped part fitting a cassette tape recorder is inserted into the cassette opening of the tape recorder, and that said part in inserted position is arranged to take up a locked position in relation to the tape recorder by means of a locking mechanism.

The device according to the present invention is mainly characteristic thereof, that it includes a body fitting to a cassette tape recorder, including a lock cylinder arranged to transform a locking and opening movement by means of a transmission means to one or a number of locking members, co-operating and/or seizable with adjacent surfaces or means in the cassette tape recorder.

A number of embodiments of the device according to the present invention are more fully described below with reference to the accompanying drawings.

FIG. 1 is a plan view of a first embodiment of a device according to the present invention.

FIG. 2 is an end view of the first embodiment.

FIG. 3 is a plan view of a second embodiment of a device according to the present invention.

FIG. 4 is an end view of the second embodiment.

FIG. 5 is a plan view of a third embodiment of a device according to the present invention.

FIG. 6 is an end view of a third embodiment.

FIG. 7 is a plan view of a fourth embodiment.

FIG. 8 is a side view of a part of a mechanism included in the fourth embodiment.

FIG. 9 is a plan view of a fifth embodiment of a device according to the present invention.

FIG. 10 is a plan view of a sixth embodiment of a device according to the present invention.

FIG. 11 is a plan view of a seventh embodiment of a device according to the present invention.

FIG. 12 is a plan view of an eighth embodiment of a device according to the present invention.

FIG. 13 is a prespective view of the control panel of a cassette tape recorder, arranged with an additional locking device.

Reference numeral 1 indicates a cassette shaped body, having outside shape and dimensions completely corresponding to a conventional tape recorder cassette. It should be emphazised, that the described embodiments only show one type of cassette, but it is understood, that the body 1 can be designed in accordance with all types of cassettes available on the market.

In order to simplify the understanding of the present invention, all embodiments are shown in a plan view with the part of the body 1 adjacent to the viewer removed, and all embodiments are also shown arranged in a cassette tape recorder, schematically indicated as partly embracing the cassette shaped body 1.

With reference to FIGS. 1 and 2, the cassette shaped body 1 is shown embracing a locking and alarm mechanism, comprising of a lock cylinder 2, arranged connected to a gear transmission set 3, whereby turning the key of the lock cylinder 2 causes a cog wheel, included in the gear transmission set 3 with an axis of rotation perpendicularly in relation to the plane of the body 1, to be rotated. Said cog wheel is at two opposed peripherial portions connected to two locking members 4, 4', which in locked position extend away from each other through two opposed wdge portions of the body 1. The free end portions of said locking members 4, 4' are arranged to take up contact with the adjacent edge portions of the cassette tape recorder embracing the body 1, as shown in FIGS. 1 and 2. The cog wheel in the gear transmission set 3, co-operating with the locking members 4, 4', is further arranged to influence an adjacently arranged wlwctrical switch means 5 when in locked position, thus closing an electrical circuit from a plug member 6, arranged at the front edge portion of the body. The electrical switch means 5 is advantageously arranged supported springacting, for reasons which will be more fully described below.

The cassette shaped device shown in FIGS. 1 and 2 is inserted into the cassette tape recorder in a conventional way and the lock cylinder 2 is locked with a corresponding key, whereafter the device no longer can be removed, To the plug member 6, a conventionally designed alarm system is connected, e.g., connected to the horn of a vehicle and based on alarm condition when the electrical circuit is broken. If the plug is removed the alarm is triggered, as well as when the tape recorder is made subject to force, since the electrical switch means 5 is supported springacting, i.e., if the vehicle is moved or if the tape recorder is made subject to blows or striking forces, the alarm is triggered.

FIGS. 3 and 4 show a second embodiment, principally designed corresponding to the embodiment shown in FIGS. 1 and 2 as described above The object of the second embodiment is only to show how the device can be arranged for use with cassette tape recorders having a different direction of insertion for the cassette, and the present invention is obviously also suitable for these types of tape recorders.

With reference to the third embodiment, as shown in FIGS. 5 and 6, said embodiment is intended to be used in connection with the type of tape recorder which is arranged with an insertion opening corresponding to the horisontal area of a cassette. Due to this fact, the lock cylinder 2 is arranged with the key opening directed upwardly from the tape recorder and the locking movement is transferred from the lock cylinder by means of a gear transmission set 3 to an axle 7, extending in the plane of the embracing body 1, having outside cogs arranged to co-operate with an upper and a lower rack 4, 4', arranged in an opposed relationship at two points along the longitudinally extending axis of the axle 7. Said racks 4, 4' act as locking members, since the outer end portions are arranged to extend through the edge portions of the body 1, when the lock cylinder is locked. Said locked position is also shown in FIGS. 5 and 6.

FIG. 7 shows a fourth embodiment of a device according to the present invention, arranged to be inserted into a cassette tape recorder in a way corresponding to the first embodiment. The fourth embodiment comprises of a surrounding body 1 embracing a lock cylinder 2, said lock cylinder being arranged connected to an axle 7 extending in the plane of the body, having peripherial cogs. Said axle 7 is arranged to co-operate with two locking members 8, 8', arranged with a rack part co-operating with the upper and lower peripherial part of the axle 7, arranged to seize the existing bearing studs for cassette tape in a tape recorder by means of a U-shaped groove, when the lock cylinder 2 is locked. Said U-shaped groove extends perpendicularlly in relation to the insertion direction of the body 1 into the tape recorder, thus preventing removal of the device, The method in which the locking members 8, 8' are arranged to the axle 7 is shown in more detail in FIG. 8. The fourth embodiment is making use of the existing studs in a cassette tape recorder as locking studs, co-operating with the locking members 8, 8' arranged in the body.

The fifth embodiment, as disclosed in FIG. 9, comprises, as the fourth embodiment. Furthermore, the existing bearing studs in the cassette tape recorder are used to cause locking, but the locking member 9 is one unit, including two racks, joined to each other by two locking members with U-shaped grooves, said grooves being arranged movable to an interlocking position with the studs. Both the fourth and the fifth embodiment are shown in an unlocked position, but the above locking effect is easily understood with reference to the accompanying drawings.

A fourth embodiment is shown in FIG. 10, having an axle 7 connected to a lock cylinder 2 for simultaneous movement of two racks, being part of a first and a second locking member 10, 10', in direction from each other and through the body 1 to an interlocked position with an embracing cassette tape recorder. The second locking member 10' is shown U-shaped, whereby two contact points are created at one edge portion of the body 1, and one contact point at the opposed edge portion.

The embodiment shown in FIG. 11 corresponds to the embodiment described with reference to FIG. 10, but a different direction of insertion for the body 1 is shown, whereby the components are arranged turned 90° in relation to the already described embodiment. FIG. 12 shows an extremely advantageous embodiment, including a lock cylinder 2 arranged in a body 1, arranged connected to a longitudinally extending axle 7, having an outer cogshaped part, co-operating with two racks 11, 11'. Said racks 11, 11' are at the end portions directed from the axle 7 connected with two wedge acting members 12, 12' having an inclined contact surface directed towards the outer side portions of the body 1, with the edge portion in the direction of insertion more adjacent to the body 1. At one point of said inclined surface, a wheel 13, 13' is connected to the wedge acting members 12, 12', and grooves are arranged in connection to said wheels 13, 13' in the adjacent side portions of the body 1. Two guiding wheels 14, 14' are further arranged in an opposed relationship at the side portions of the body 1 in a position adjacent to the insertion direction for the cassette tape recorder. When the lock cylinder 2 is locked by means of a key, the wedge acting members 12, 12' force the wheels 13, 13' against the adjacent edge portions of the tape recorder. The wedge acting members 12, 12' are preferably arranged from a flexible material, or spring acting, in order to faciliate a complete locking movement for the lock cylinder 2. If force is used in order to remove the body 1 from the tape recorder when the device is in locked position, the wedge acting members 12, 12' cause the locking members 13, 13' (the wheels) to increase the contact pressure for every attempt to remove the body 1 out of the tape recorder, since the contact point for each wheel 13, 13' is moved along the wedge acting members 12, 12' to a more adjacent position to the tape recorder.

Finally, FIG. 13 shows a method to lock a tape recorder by arranging a lock 15 in the key used for reject of a tape recorder cassette from the tape recorder, e.g., when the cassette is turned. The embodiment shown in FIG. 13 is intended as an example of an alternative or additional embodiment, which prevents an unauthorized person from removing a cassette shaped part from a tape recorder, which is the basic inventive thought.

The embodiments shown and described only serve as examples of embodiments within the scope of the method according to the present invention, which can be defined as a method to prevent anuauthorized persons from removing a cassette shaped part arranged in a cassette tape recorder. The described and shown embodiments indicate a number of ways to achieve the object of the invention, e.g., by means of locking members co-operating with recesses in the tape recorder, by means of locking members seizing and co-operating with the studs arranged in a tape recorder, normally used for insertion into the tape centers of a conventional cassette, and by means, which wedge-acting take up contact with at least one side surface in the cassette tape recorder adjacent an inserted device. The various mechanisms described to accomplish a locking effect can obviously be modified and combined in a number of previously known ways, still maintaining the inventive thought. Further more, alarm systems of the type described with reference to the first and second embodiment can advantageously be used in connection with a device according to the present invention.

The cassette shaped body 1 is advantageously manufactured from metal, in order to reduce the risk for damage. It should be mentioned, that the most common types of tape recorders, especially for mobile use, only leave one edge portion of the device visable, with the remaining part of the body 1 embraced by the cassette tape recorder. Therefore, the device cannot be removed by means of conventional tools, since the tools cannot grip the body. This fact protects the visable part of the device and the visable part can advantageously be arranged with a warning text, informing unauthorized persons that a locking device is attached.

The present invention is in no way restricted to the shown and described embodiments, since many other embodiments are possible within the scope of the invention and the following claims.

I claim:

1. A device for preventing unauthorized use of a cassette tape recorder comprising a hollow body having a substantially flat rectangular outer casing corresponding in size and shape to a standard tape recorder cassette and locking means associated with said body for locking said body in a cassette opening of a tape recorder by engagement of a part of said locking means with a part of said tape recorder within said cassette opening, said locking means including means defining a lock opening in said casing, a rotary lock cylinder having a keyhole accessible from the exterior of said casing, a movable locking member within said casing having projected and retracted positions with respect to said lock opening and transmission means within said casing connected between said lock cylinder and said locking member for converting rotation of said cylinder into projecting and retracting movements of said locking member with respect to said opening.

2. The device of claim 1 wherein said casing includes substantially parallel top and bottom walls and a shallow side wall defining said lock opening and said locking member is movable within said casing between said top and bottom walls in a plane substantially parallel to said top and bottom walls between said projected and retracted positions with respect to said lock opening.

3. The device of claim 2 wherein said locking member is a wheel and said transmission means includes a wedge shaped member having an inclined surface in contact with the periphery of said wheel.

4. The device of claim 3 wherein said transmission means includes a rack member attached to said wedge shaped member and gear means rotated by said lock cylinder and meshing with said rack member.

5. The device of claim 2 wherein said locking member comprises a longitudinally movable bar having one end movable through said lock opening.

6. The device of claim 5, wherein said transmission means comprises gear means between said lock cylinder and said bar for converting rotary movements of said lock cylinder into longitudinal movements of said bar.

7. The device of claim 6 wherein said gear means comprises a first gear wheel rotated by said lock cylinder, said first gear wheel meshing with a second gear wheel having an axis perpendicular to the lock cylinder axis and a pivotal connection between said second gear wheel and said bar.

8. The device of claim 6 wherein said gear means comprises a pinion carried by said lock cylinder and meshing with a rack associated with said bar.

9. The device of claim 1 wherein said casing comprises substantially parallel top and bottom walls and a shallow side wall, said top and bottom walls including aligned openings to fit over a tape record spindle, said aligned openings defining said lock opening and said locking member being movable within said casing in a plane substantially parallel to said top and bottom walls between said projected and retracted positions with respect to said lock opening.

10. The device of claim 9 wherein said lock member comprises a longitudinally movable bar having a recessed head portion movable into and out of said lock opening.

11. The device of claim 10 wherein said transmission means comprises gear means connected between said lock cylinder and said bar.

12. The device of claim 11 wherein said gear means includes a pinion carried by said lock cylinder and meshing with a rack formed on said bar.

13. The device of claim 1 including an electric circuit having a switch and a plug for connecting said circuit to an external alarm system.

14. The device of claim 13 wherein said switch includes spring means for triggering the alarm when the device is subject to shaking or vibratory movement.

15. The device of claim 13 wherein the switch activates the circuit when the locking member is moved to said projected position and deactivates the circuit when the locking member is moved to said retracted position.

16. A device for preventing unauthorized use of a cassette tape recorder comprising a hollow body having a substantially flat rectangular outer casing corresponding in size and shape to a standard tape recorder cassette and locking means associated with said body for locking said body in a cassette opening of a tape recorder by engagement of a part of said locking means with a part of said tape recorder within said cassette opening, said casing including top and bottom walls and a shallow side wall and said locking means including means defining a lock opening in said side wall, a rotary lock cylinder having a keyhole accessible from the exterior of said casing, a movable locking member within said casing having projected and retracted position with respect to said lock opening and gear transmission means within said body connected between said lock cylinder and said locking member for converting rotation of said cylinder into projecting and retracting movements of said locking member with respect to said opening.

17. The device of claim 16 wherein said locking member is a wheel and said transmission means includes a wedge shaped member having an inclined surface in contact with the periphery of said wheel.

18. The device of claim 17 wherein said transmission means includes a rack member attached to said wedge shaped member and gear means rotated by said lock cylinder and meshing with said rack member.

19. The device of claim 17 wherein said wedge shaped member is made of resilient material.

* * * * *